US011862109B2

(12) United States Patent
Kim

(10) Patent No.: US 11,862,109 B2
(45) Date of Patent: Jan. 2, 2024

(54) DISPLAY DEVICE HAVING ANALOG-TO-DIGITAL CONVERTER FOR COMPENSATING BASED ON SUBPIXEL CHARACTERISTIC

(71) Applicant: LG DISPLAY CO., LTD., Seoul (KR)

(72) Inventor: Jong-Won Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/877,295

(22) Filed: Jul. 29, 2022

(65) Prior Publication Data

US 2023/0083384 A1 Mar. 16, 2023

(30) Foreign Application Priority Data

Sep. 15, 2021 (KR) ........................ 10-2021-0123217

(51) Int. Cl.
*G09G 3/3291* (2016.01)

(52) U.S. Cl.
CPC ... *G09G 3/3291* (2013.01); *G09G 2300/0828* (2013.01); *G09G 2330/021* (2013.01)

(58) Field of Classification Search
CPC .................................................... G09G 3/3291
USPC .......................................................... 345/204
See application file for complete search history.

(56) References Cited

U.S. PATENT DOCUMENTS

2016/0189623 A1* 6/2016 Miwa .................. G09G 3/3233 345/212
2020/0160781 A1* 5/2020 Park ..................... G09G 3/3266

* cited by examiner

*Primary Examiner* — Long D Pham
(74) *Attorney, Agent, or Firm* — POLSINELLI PC

(57) ABSTRACT

A display device includes a reference voltage line electrically connected with a first node and receiving a sensing voltage reflecting a characteristic value of at least one subpixel and an analog-to-digital converter including a second node, receiving the sensing voltage, and outputting a digital value corresponding to the sensing voltage, wherein a voltage level of a driving reference voltage applied to the first node and a voltage level of an analog-to-digital converting reference voltage applied to the second node are changed depending on a level of the sensing voltage, thereby compensating for changes in the characteristic values of subpixels even when abnormal subpixels for which appropriate compensation for changes in characteristic values of subpixels is limited.

20 Claims, 9 Drawing Sheets

DISPLAY DEVICE HAVING ANALOG-TO-DIGITAL CONVERTER FOR COMPENSATING BASED ON SUBPIXEL CHARACTERISTIC

CROSS-REFERENCE TO RELATED APPLICATION

This application claims the priority of Korean Patent Application No. 10-2021-0123217, filed on Sep. 15, 2021, which is hereby incorporated by reference in its entirety.

BACKGROUND

Field of the Disclosure

The present disclosure relates to a display device and a method for driving the display device.

Description of the Background

As the information society develops, various demands for display devices for displaying images are increasing, and various types of display devices, such as liquid crystal displays (LCDs) and organic light emitting displays, are used.

The display device drives a plurality of subpixels to display an image. As an image is displayed for a long time, the elements constituting the driving circuit inside the subpixel may deteriorate. When the elements constituting the driving circuit inside the subpixel are deteriorated due to long-term driving, the characteristic values of the subpixels are changed and display quality may be degraded.

SUMMARY

Accordingly, the present disclosure is directed to a display device and a method for driving the display device that substantially obviate one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a display device and a method for driving the display device, which can compensate for a change in subpixel characteristic value even for abnormal subpixels for which appropriate compensation for subpixel characteristic values is limited.

To achieve these and other advantages and in accordance with the present disclosure, as embodied and broadly described, a display device includes a reference voltage line electrically connected with a first node and configured to receive a sensing voltage reflecting a characteristic value of at least one subpixel and an analog-to-digital converter including a second node, configured to receive the sensing voltage and output a digital value corresponding to the sensing voltage, wherein a voltage level of a driving reference voltage applied to the first node and a voltage level of an analog-to-digital converting reference voltage applied to the second node are changed depending on a level of the sensing voltage.

In an another aspect of the present disclosure, a method for driving a display device includes receiving a sensing voltage reflecting a characteristic value of at least one subpixel from a reference voltage line and outputting a digital value corresponding to the received sensing voltage to a controller, by an analog-to-digital converter, changing a voltage level of an analog-to-digital converting reference voltage input to the analog-to-digital converter based on the sensing voltage, and changing a voltage level of a driving reference voltage input to a first node based on a degree of the change in the voltage level of the analog-to-digital converting reference voltage, wherein the first node is a node electrically connected with the reference voltage line.

In a further aspect of the present disclosure, a display device includes an analog-to-digital converter configured to receive a sensing voltage reflecting a characteristic value of at least one subpixel from a reference voltage line and to output a digital value corresponding to the received sensing voltage; a controller configured to receive the digital value from the analog-to-digital converter and to sense the characteristic value of the at least one subpixel when the received digital value is a first saturation value or a second saturation value; and a power management circuit configured to change an analog-to-digital converting reference voltage under control of the controller, wherein the controller is configured to control the analog-to-digital converter to change a voltage level of the analog-to-digital converting reference voltage during an off-sensing process period and to perform a sensing driving operation to compensate for characteristic values of the plurality of subpixels during the off-sensing process period.

In the present disclosure, a display device and a method for driving the display device, which can compensate for a change in subpixel characteristic value even for abnormal subpixels for which appropriate compensation for subpixel characteristic values is limited, are provided.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the present disclosure will be more clearly understood from the following detailed description, taken in conjunction with the accompanying drawings, in which.

DETAILED DESCRIPTION

Hereinafter, aspects of the present disclosure are described in detail with reference to the accompanying drawings. The same or substantially the same reference denotations are used to refer to the same or substantially the same elements throughout the specification and the drawings. When determined to make the subject matter of the present disclosure unclear, the detailed of the known art or functions may be skipped. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence of the components is not limited by the denotations in light of order or sequence.

In describing the positional relationship between components, when two or more components are described as "connected", "coupled" or "linked", the two or more components may be directly "connected", "coupled" or "linked"", or another component may intervene. Here, the other component may be included in one or more of the two or more components that are "connected", "coupled" or "linked" to each other.

In relation to components, operational methods or manufacturing methods, when A is referred to as being "after," "subsequent to," "next," and "before," A and B may be discontinuous from each other unless mentioned with the term "immediately" or "directly."

When a component is designated with a value or its corresponding information (e.g., level), the value or the corresponding information may be interpreted as including a tolerance that may arise due to various factors (e.g., process factors, internal or external impacts, or noise).

Hereinafter, various aspects of the present disclosure are described in detail with reference to the accompanying drawings.

Figure 1:
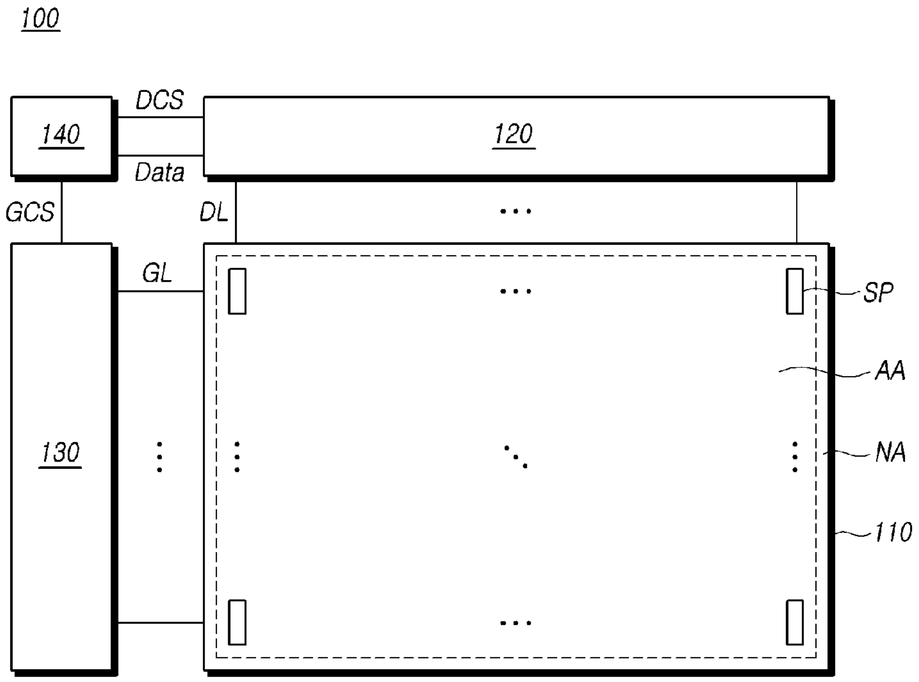
FIG. 1 is a view illustrating a display device according to the present disclosure.

FIG. 1 is a view illustrating a display device according to the present disclosure.

Referring to FIG. 1, a display device 100 according to the present disclosure may include a display panel 110, a data driving circuit 120 and a gate driving circuit 130 for driving the display panel 110, and a controller 140 for controlling the data driving circuit 120 and the gate driving circuit 130.

In the display panel 110, signal lines, such as a plurality of data lines DL and a plurality of gate lines GL, may be disposed on a substrate. In the display panel 110, a plurality of subpixels SP connected with the plurality of data lines DL and the gate lines GL may be disposed.

The display panel 110 may include a display area AA in which images are displayed and a non-display area NA in which no image is displayed. In the display panel 110, a plurality of subpixels SP for displaying an image may be disposed in the display area AA and, in the non-display area NA, the data driving circuit 120 and the gate driving circuit 130 may be mounted, or pad units connected with the data driving circuit 120 or the gate driving circuit 130 may be disposed.

The data driving circuit 120 is a circuit configured to drive the plurality of data lines DL, and may supply data signals to the plurality of data lines DL. The gate driving circuit 130 is a circuit configured to drive the plurality of gate lines GL, and may supply gate signals Vgate to the plurality of gate lines GL. The controller 140 may supply a data driving timing control signal DCS to the data driving circuit 120 to control the operation timing of the data driving circuit 120. The controller 140 may supply a gate driving timing control signal GCS for controlling the operation timing of the gate driving circuit 130 to the gate driving circuit 130.

The controller 140 may start scanning according to a timing implemented in each frame, convert input image data input from the outside into image data Data suited for the data signal format used in the data driving circuit 120, supply the image data Data to the data driving circuit 120, and control data driving at an appropriate time suited for scanning.

The controller 140 receives, from the outside (e.g., a host system), various timing signals including a vertical synchronization signal Vsync, a horizontal synchronization signal Hsync, an input data enable signal DE, and a clock signal, along with the input image data.

To control the data driving circuit 120 and the gate driving circuit 130, the controller 140 receives timing signals, such as the vertical synchronization signal Vsync, horizontal synchronization signal Hsync, input data enable signal DE, and clock signal CLK, generates various control signals DCS and GCS, and outputs the control signals to the data driving circuit 120 and the gate driving circuit 130.

To control the gate driving circuit 130, the controller 140 outputs various gate driving timing control signals GCS including a gate start pulse GSP, a gate shift clock GSC, and a gate output enable signal GOE.

To control the data driving circuit 140, the controller 140 outputs various data driving timing control signals DCS including, e.g., a source start pulse SSP and a source sampling clock.

The data driving circuit 120 receives the image data Data from the controller 140 and drives the plurality of data lines DL.

The data driving circuit 120 may include one or more source driving integrated circuit (SDICs).

Each source driving integrated circuit (SDIC) may be connected with the display panel 110 by a tape automated bonding (TAB) method or connected to a bonding pad of the display panel 110 by a chip on glass (COG) method. Alternatively, it may be implemented by a chip on film (COF) method and connected with the display panel 110.

The gate driving circuit 130 may output a gate signal of a turn-on level voltage or a gate signal of a turn-off level voltage according to the control of the controller 140. The gate driving circuit 130 may drive the plurality of gate lines GL by supplying gate signals of the turn-on level voltage to the plurality of gate lines GL.

The gate driving circuit 130 may be connected with the display panel 110 by a tape automated bonding (TAB) method or connected to a bonding pad of the self-emission display panel 110 by a COG or chip on panel (COP) method or may be connected with the display panel 110 according to a COF method.

The gate driving circuit 130 may be formed in a gate in panel (GIP) type, in the non-display area NA of the display panel 110. The gate driving circuit 130 may be disposed on the substrate of the display panel 110 or may be connected to the substrate of the display panel 110. The gate driving circuit 130 that is of a GIP type may be disposed in the non-display area NA of the substrate. The gate driving circuit 130 that is of a chip-on-glass (COG) type or chip-on-film (COF) type may be connected to the substrate of the display panel 110.

When a specific gate line GL is opened by the gate driving circuit 130, the data driving circuit 120 may convert the image data Data received from the controller 140 into an analog data signal and supply it to the plurality of data lines DL.

The data driving circuit 120 may be connected with one side (e.g., an upper or lower side) of the display panel 110. Depending on the driving scheme or the panel design scheme, the data driving circuit 120 may be connected with both sides (e.g., upper and lower sides) of the self-emission display panel 110, or two or more of the four sides of the self-emission display panel 110.

The gate driving circuit 130 may be connected with one side (e.g., a left or right side) of the display panel 110. Depending on the driving scheme or the panel design scheme, the gate driving circuit 130 may be connected with both sides (e.g., left and right sides) of the display panel 110, or two or more of the four sides of the display panel 110.

The controller 140 may be a timing controller used in typical display technology, a control device that may perform other control functions as well as the functions of the timing controller, or a control device other than the timing controller, or may be a circuit in the control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit.

The controller 140 may transmit/receive signals to/from the data driving circuit 120 according to one or more predetermined interfaces. The interface may include, e.g., a low voltage differential signaling (LVDS) interface, an EPI interface, and a serial peripheral interface (SPI).

The controller 140 may include a storage medium, such as one or more registers.

The display device 100 according to the present disclosure may be a display including a backlight unit, such as a liquid crystal display, or may be a self-emission display, such as an organic light emitting display, a quantum dot display, or a micro light emitting diode (LED) display.

According to an aspect, when the display device 100 is an organic light emitting display, each subpixel SP may include an organic light emitting diode (OLED), which is self-emissive, as a light emitting element. According to an aspect, when the display device 100 is a quantum dot display, each subpixel SP may include a light emitting element formed of a quantum dot, which is a self-emissive semiconductor crystal. According to an aspect, when the display device 100 is a micro LED display, each subpixel SP may include a micro light emitting diode, which is self-emissive and formed of an inorganic material, as a light emitting element.

Figure 2:
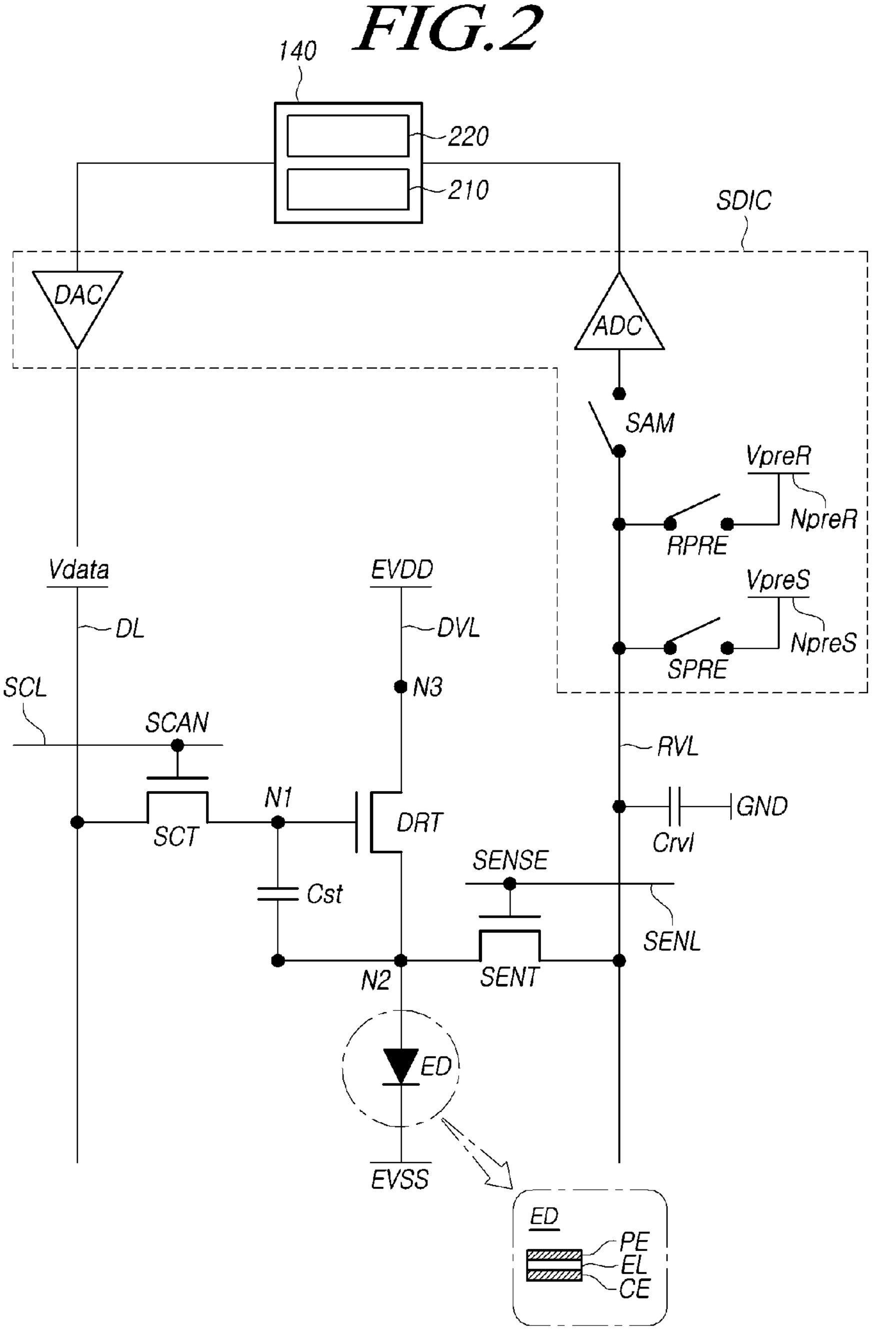
FIG. 2 is a view schematically illustrating an equivalent circuit of a subpixel SP and a configuration for compensating for characteristic values of the subpixel SP according to the present disclosure.

FIG. 2 is a view schematically illustrating an equivalent circuit of a subpixel SP and a configuration for compensating for characteristic values of the subpixel SP according to the present disclosure.

Referring to FIG. 2, each of a plurality of subpixels SP may include a light emitting element ED, a driving transistor DRT, a scan transistor TSC, and a storage capacitor Cst.

The light emitting element ED may include a pixel electrode PE and a common electrode CE and may include a light emitting layer EL positioned between the pixel electrode PE and the common electrode CE.

The pixel electrode PE of the light emitting element ED may be an electrode disposed in each subpixel SP, and the common electrode CE may be an electrode commonly disposed in all the subpixels SP. Here, the pixel electrode PE may be an anode electrode, and the common electrode CE may be a cathode electrode. Conversely, the pixel electrode PE may be a cathode electrode, and the common electrode CE may be an anode electrode. The common electrode CE of the light emitting element ED may receive a base voltage EVS S.

For example, the light emitting element ED may be an organic light emitting diode (OLED), a light emitting diode (LED), or a quantum dot light emitting element.

The driving transistor DRT is a transistor for driving the light emitting element ED, and may include a first node N1, a second node N2, and a third node N3.

The first node N1 of the driving transistor DRT may be a gate node of the driving transistor DRT, and may be electrically connected with a source node or a drain node of the scan transistor SCT. The second node N2 of the driving transistor DRT may be a source node or a drain node of the driving transistor DRT, and may be electrically connected with a source node or a drain node of the sensing transistor SENT and may also be electrically connected with the pixel electrode PE of the light emitting element ED. The third node N3 of the driving transistor DRT may be electrically connected with a driving voltage line DVL supplying a driving voltage EVDD.

The scan transistor SCT may be controlled by a scan pulse SCAN, which is a type of gate signal, and may be electrically connected to the first node N1 of the driving transistor DRT and the data line DL. In other words, the scan transistor SCT may be turned on or off according to the scan pulse SCAN supplied from the scan line SCL, which is a type of the gate line GL, controlling the connection between the data line DL and the first node N1 of the driving transistor DRT.

The scan transistor SCT may be turned on by the scan pulse SCAN having a turn-on level voltage and transfer the data signal Vdata supplied from the data line DL to the first node N1 of the driving transistor DRT.

If the scan transistor SCT is an n-type transistor, the turn-on level voltage of the scan pulse SCAN may be a high level voltage. If the scan transistor SCT is a p-type transistor, the turn-on level voltage of the scan pulse SCAN may be a low level voltage.

The storage capacitor Cst may be electrically connected to the first node N1 and the second node N2 of the driving transistor DRT. The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP may emit light.

Referring to FIG. 2, each of the plurality of subpixels SP disposed on the display panel 110 of the display device 100 may further include a sensing transistor SENT.

The sensing transistor SENT may be controlled by a sense pulse SENSE, which is a type of gate signal, and may be electrically connected to the second node N2 of the driving transistor DRT and a reference voltage line RVL. In other words, the sensing transistor SENT may be turned on or off according to the sense pulse SENSE supplied from the sense line SENL, which is another type of the gate line GL, controlling the connection between the sense line SENL and the second node N2 of the driving transistor DRT.

The second node N2 of the driving transistor DRT is also referred to as a sensing node.

The sensing transistor SENT may be turned on by the sense pulse SENSE having a turn-on level voltage and transfer a reference voltage supplied from the reference voltage line RVL to the second node N2 of the driving transistor DRT. The reference voltage line RVL is also referred to as a sensing line.

The reference voltage may include a sensing reference voltage VpreS and/or a driving reference voltage VpreR.

The driving reference voltage VpreR and the sensing reference voltage VpreS may be common voltages input to the plurality of subpixels SP electrically connected to the reference voltage line RVL.

The driving reference voltage VpreR may be a voltage input to the second node N2 of the driving transistor DRT during an active period when the data signal Vdata for image display is input to the plurality of data lines DL.

In the active period, the voltage of the second node N2 of the driving transistor DRT may be initialized to the driving reference voltage VpreR. According to the voltage difference Vgs between the first node N1 and the second node N2 of the driving transistor DRT and the threshold voltage Vth of the driving transistor DRT, the light emitting diode ED emits light in different brightness levels.

The sensing reference voltage VpreS may be a voltage input to the second node N2 of the driving transistor DRT during a blank period between two different active periods. In the blank period, the voltage of the second node N2 of the driving transistor DRT may be initialized to the sensing reference voltage VpreS.

The display device according to the present disclosure may further include an initialization switch configured to input the driving reference voltage VpreR or the sensing reference voltage VpreS to the reference voltage line RVL according to timing. The initialization switch may include a first initialization switch RPRE and a second initialization switch SPRE.

The first initialization switch RPRE may switch an electrical connection between the driving reference voltage input node NpreR and the reference voltage line RVL.

The second initialization switch SPRE may switch an electrical connection between the sensing reference voltage input node NpreS and the reference voltage line RVL.

The sensing transistor SENT may be turned on by the sense pulse SENSE having a turn-on level voltage, transferring the voltage of the second node N2 of the driving transistor DRT to the reference voltage line RVL.

If the sensing transistor SENT is an n-type transistor, the turn-on level voltage of the sense pulse SENSE may be a high level voltage. If the sensing transistor SENT is a p-type transistor, the turn-on level voltage of the sense pulse SENSE may be a low level voltage.

The function in which the sensing transistor SENT transfers the voltage of the second node N2 of the driving transistor DRT to the reference voltage line RVL may be used upon driving to sense the characteristic value of the subpixel SP. In this case, the voltage transferred to the reference voltage line RVL may be a voltage for calculating the characteristic value of the subpixel SP or a voltage reflecting the characteristic value of the subpixel SP.

Each of the driving transistor DRT, the scan transistor SCT, and the sensing transistor SENT may be an n-type transistor or a p-type transistor. In aspects of the disclosure, for convenience of description, each of the driving transistor DRT, the scan transistor SCT, and the sensing transistor SENT is an n-type transistor.

The storage capacitor Cst is not a parasitic capacitor (e.g., Cgs or Cgd) which is an internal capacitor existing between the gate node and the source node (or drain node) of the driving transistor DRT, but may be an external capacitor intentionally designed outside the driving transistor DRT.

The scan line SCL and the sense line SENL may be different gate lines GL. In this case, the scan pulse SCAN and the sense pulse SENSE may be separate gate signals, and the on-off timings of the scan transistor SCT and the on-off timings of the sensing transistor SENT in one subpixel SP may be independent. In other words, the on-off timings of the scan transistor SCT and the on-off timings of the sensing transistor SENT in one subpixel SP may be the same or different.

Alternatively, the scan line SCL and the sense line SENL may be the same gate line GL. In other words, the gate node of the scan transistor SCT and the gate node of the sensing transistor SENT in one subpixel SP may be connected with one gate line GL. In this case, the scan pulse SCAN and the sense pulse SENSE may be the same gate signal, and the on-off timings of the scan transistor SCT and the on-off timings of the sensing transistor SENT in one subpixel SP may be identical.

The structure of the subpixel SP shown in FIG. 2 is merely an example, and various changes may be made thereto, e.g., such as including one or more transistors or one or more capacitors.

Although the structure of the subpixel SP is described with reference to FIG. 2 under the assumption that the display device 100 is a self-emission display device, if the display device 100 is a liquid crystal display, each subpixel SP may include a transistor and a pixel electrode.

Referring to FIG. 2, the display device 100 according to the present disclosure may include a line capacitor Crvl. The line capacitor Crvl may be a capacitor element having one end electrically connected to the reference voltage line RVL and the other end connected to the ground GND or may be a parasitic capacitor formed on the reference voltage line RVL.

Referring to FIG. 2, the source driving integrated circuit SDIC may further include an analog-to-digital converter ADC and a sampling switch SAM.

The reference voltage line RVL may be electrically connected to the analog-to-digital converter ADC. The analog-to-digital converter ADC may sense the voltage of the reference voltage line RVL. The sensing voltage sensed by the analog-to-digital converter ADC may be a voltage reflecting the characteristic value of the subpixel SP.

In the disclosure, the characteristic value of the subpixel SP may be a characteristic value of the driving transistor DRT or the light emitting element ED. The characteristic value of the driving transistor DRT may include a threshold voltage and mobility of the driving transistor DRT. The characteristic value of the light emitting element ED may include a threshold voltage of the light emitting element ED.

The analog-to-digital converter ADC may receive a sensing analog voltage, convert it into a digital value, and output it to the controller 140.

The display device according to the present disclosure may further include a sampling switch SAM configured to switch an electrical connection between the analog-to-digital converters ADC.

The controller 140 may include a memory 210 configured to store characteristic value information about the subpixel SP and a compensation circuit 220 configured to perform calculation for compensating for a change in the characteristic value of the subpixel SP based on the information stored in the memory 210.

The memory 210 may store information for compensating for the characteristic value of the subpixel SP. For example, the memory 210 may store information about the threshold voltage and mobility of the driving transistor DRT of each of the plurality of subpixels SP and information about the threshold voltage of the light emitting element ED included in the subpixel SP.

Information about the threshold voltage of the light emitting element ED may be stored in a lookup table LUT.

The compensation circuit 220 calculates the degree of change in the characteristic value of the corresponding subpixel SP based on the characteristic value information about the subpixel SP stored in the memory 210 and the digital value received from the analog-to-digital converter ADC. The compensation circuit 220 may update the characteristic value of the subpixel SP stored in the memory 210 based on the calculated value.

The controller 140 compensates for image data by applying the change in the characteristic value of the subpixel SP, calculated by the compensation circuit 220, thereby driving the data driving circuit 120.

The data signal Vdata reflecting the change in the characteristic value of the subpixel SP may be output to the data line DL through the digital-to-analog converter DAC.

The process of sensing the change in the characteristic value of the subpixel SP and compensating for the same is referred to as a "subpixel characteristic value compensation process."

Figure 3:
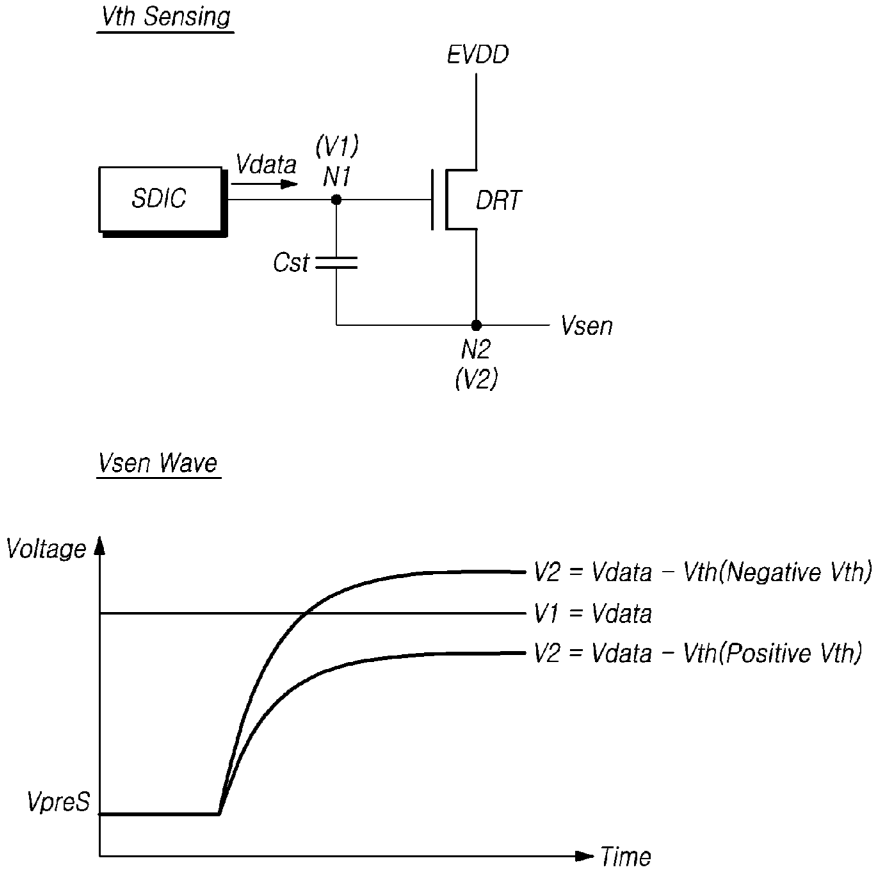
FIG. 3 is a view illustrating a threshold voltage sensing (Vth sensing) driving scheme in a display device according to the present disclosure.

FIG. 3 is a view illustrating a threshold voltage sensing (i.e., Vth sensing) driving scheme in a display device according to the present disclosure.

The threshold voltage sensing driving operation for the driving transistor DRT may be performed through a sensing process including an initialization step, a tracking step, and a sampling step.

The initialization step is the step of initializing the first node N1 and the second node N2 of the driving transistor DRT.

In the initialization step, the scan transistor SCT and the sensing transistor SENT is turned on, and the second initialization switch SPRE is turned on.

Accordingly, the first node N1 and the second node N2 of the driving transistor DRT are initialized as a threshold voltage sensing driving data signal Vdata and a sensing reference voltage VpreS, respectively. (V1=Vdata, V2=VpreS)

The tracking step is a step that changes the voltage V2 of the second node N2 of the driving transistor DRT until the second node N2 of the driving transistor DRT becomes a voltage state reflecting the threshold voltage or its change.

In other words, the tracking step is the step of tracking the voltage of the second node N2 of the driving transistor DRT that may reflect the threshold voltage or a change thereof.

In the tracking step, the second initialization switch SPRE is turned off or the sensing transistor SENT is turned off, so that the second node N2 of the driving transistor DRT is floated.

Accordingly, the voltage of the second node N2 of the driving transistor DRT rises.

The rise of voltage V2 of the second node N2 of the driving transistor DRT gradually slows down, and the voltage V2 is then saturated.

The saturated voltage of the second node N2 of the driving transistor DRT may correspond to the difference between the data signal Vdata and the threshold voltage Vth or the difference between the data signal Vdata and the threshold voltage deviation ΔVth.

If the voltage V2 of the second node N2 of the driving transistor DRT is saturated, the sampling step may be performed.

The sampling step is the step of measuring the voltage reflecting the threshold voltage or its change, and the analog-to-digital converter ADC senses the voltage of the reference voltage line RVL, i.e., the voltage V2 of the second node N2 of the driving transistor DRT.

The voltage Vsen sensed by the analog-to-digital converter ADC may be the voltage Vdata SEN-Vth which is the data signal Vdata minus the threshold voltage Vth or the voltage Vdata-ΔVth which is the data signal Vdata minus the threshold voltage deviation ΔVth. Vth may be a positive threshold voltage Positive Vth or a negative threshold voltage Negative Vth.

Figure 4:
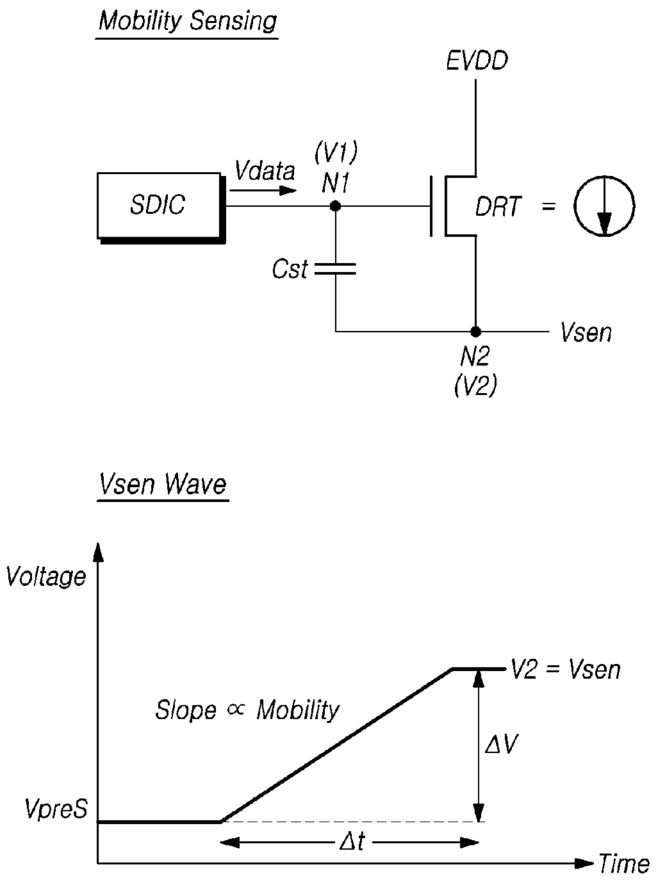
FIG. 4 is a view illustrating a mobility sensing driving scheme for a driving transistor DRT in a display device according to the present disclosure.

FIG. 4 is a view illustrating a mobility sensing driving scheme for a driving transistor DRT in a display device according to the present disclosure.

The mobility sensing driving operation for the driving transistor DRT may be performed through a sensing process including an initialization step, a tracking step, and a sampling step.

The initialization step is the step of initializing the first node N1 and the second node N2 of the driving transistor DRT.

In the initialization step, the scan transistor SCT and the sensing transistor SENT is turned on, and the second initialization switch SPRE is turned on.

Accordingly, the first node N1 and the second node N2 of the driving transistor DRT are initialized as a mobility sensing driving data signal Vdata and a sensing reference voltage VpreS, respectively. (V1=Vdata, V2=VpreS)

The tracking step is a step that changes the voltage V2 of the second node N2 of the driving transistor DRT until the voltage of the second node N2 of the driving transistor DRT becomes a voltage state reflecting the mobility or its change.

In other words, the tracking step is the step of tracking the voltage of the second node N2 of the driving transistor DRT that may reflect the mobility or its change.

In the tracking step, the second initialization switch SPRE is turned off or the sensing transistor SENT is turned off, so that the second node N2 of the driving transistor DRT is floated. In this case, the scan transistor SCT may be turned off, so that the first node N1 of the driving transistor DRT may also be floated.

Accordingly, the voltage V2 of the second node N2 of the driving transistor DRT starts to rise.

The rising rate of the voltage V2 of the second node N2 of the driving transistor DRT varies depending on the current capability (i.e., mobility) of the driving transistor DRT.

As the current capability (mobility) of the driving transistor DRT increases, the voltage V2 of the second node N2 of the driving transistor DRT further sharply rises.

After the tracking period proceeds during a predetermined time Δt, i.e., after the voltage V2 of the second node N2 of the driving transistor DRT rises during the preset tracking time Δt, the sampling period may proceed.

During the tracking step, the rising rate of the voltage of the second node N2 of the driving transistor DRT corresponds to a voltage variation ΔV for the predetermined time Δt.

In the sampling step, the sampling switch SAM is turned on, so that the analog-to-digital converter ADC and the reference voltage line RVL are electrically connected.

Accordingly, the analog-to-digital converter ADC senses the voltage of the reference voltage line RVL, i.e., the voltage V2 of the second node N2 of the driving transistor DRT.

The voltage Vsen sensed by the analog-to-digital converter ADC may be the voltage which is the sensing reference voltage VpreS plus the voltage variation Δt during the preset tracking time Δt.

According to the sensing driving operation for threshold voltage or mobility as described above in connection with FIGS. 3 and 4, the analog-to-digital converter ADC converts the voltage Vsen sensed for threshold voltage sensing or mobility sensing into a digital value and generates and outputs sensing data including the digital value (sensing value).

The sensing data output from the analog-to-digital converter ADC may be provided to the compensation circuit 220. In some cases, the sensing data may be provided to the compensation circuit 220 through the memory 210.

The compensation circuit 220 may grasp the characteristic value (e.g., threshold voltage or mobility) of the driving transistor DRT in the corresponding subpixel or a change in the characteristic value of the driving transistor DRT (e.g., a change in threshold voltage or a change in mobility) based on the sensing data provided from the analog-to-digital converter ADC and perform a characteristic value compensation process.

The change in the characteristic value of the driving transistor DRT may mean a change in the current sensing data from previous sensing data or a change in the current sensing data from initial compensation data.

Accordingly, it is possible to grasp the characteristic value deviation between driving transistors DRT by comparing characteristic values or changes in characteristic value between the driving transistors DRT. When the change in the characteristic value of the driving transistor DRT means a change in the current sensing data from the initial compensation data, it is possible to grasp the characteristic value deviation (i.e., subpixel luminance deviation) between driving transistors DRT from the change in the characteristic value of the driving transistor DRT.

The initial compensation data may be initial setting data that is set and stored when the display device is manufactured.

The characteristic value compensation process may include threshold voltage compensation processing for compensating for the threshold voltage of the driving transistor DRT and mobility compensation processing for compensating for the mobility of the driving transistor DRT.

The threshold voltage compensation processing may include the processing of calculating compensation data for compensating for the threshold voltage or threshold voltage deviation (change in threshold voltage), storing the calculated compensation data in the memory 210, or changing the image data Data into the calculated compensation data.

The mobility compensation processing may include the processing of calculating compensation data for compensating for the mobility or mobility deviation (change in mobility), storing the calculated compensation data in the memory 210, or changing the image data Data into the calculated compensation data.

The compensation circuit 220 may change the image data Data through the threshold voltage compensation processing or mobility compensation processing and supply the changed data to the corresponding source driving integrated circuit SDIC in the data driving circuit 120.

Accordingly, the source driving integrated circuit SDIC converts the data changed by the compensation unit 220 into a data signal through a digital-to-analog converter (DAC) and supplies it to the corresponding subpixel. By so doing, it is possible to indeed achieve compensation for the subpixel characteristic value (threshold voltage compensation or mobility compensation).

When a power on signal is generated, the display device according to aspects of the present disclosure may perform any one of the above-described compensation processes. Such sensing process is referred to as an "on-sensing process."

When a power off signal is generated, the display device according to the present disclosure may perform any one of the above-described compensation processes before an off-sequence, e.g., power-off, proceeds. Such sensing process is referred to as an "off-sensing process."

Figure 5:
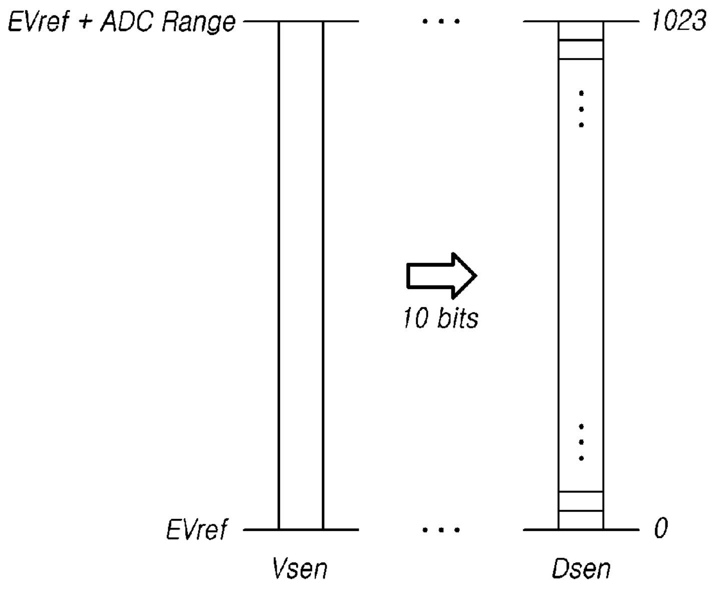
FIG. 5 is a view schematically illustrating an input/output correspondence of an analog-to-digital converter ADC according to the present disclosure.

FIG. 5 is a view schematically illustrating an input/output correspondence of an analog-to-digital converter ADC according to the present disclosure.

Referring to FIG. 5, the analog-to-digital converter ADC may convert the sensing voltage Vsen, which is between the analog-to-digital converting reference voltage EVref and the analog-to-digital converting reference voltage EVref plus a predetermined voltage range (EVref+ADC Range) into a digital value Dsen corresponding to the corresponding sensing voltage Vsen.

The range of the digital value output from the analog-to-digital converter ADC may be determined according to the resolution of the analog-to-digital converter ADC.

For example, when the resolution of the analog-to-digital converter ADC is 10 bits, the analog-to-digital converter ADC may match the input sensing voltage Vsen to any one of digital values from 0 to 1023 and output the result.

As another example, in the range of the digital value output from the analog-to-digital converter ADC, the analog-to-digital converter ADC may match the input sensing voltage Vsen to correspond to any one of digital values from 0 to 255 and output the result.

The smallest value and the largest value among the digital values output from the analog-to-digital converter ADC may be defined as saturation values. In other words, the analog-to-digital converter ADC may not output digital values smaller than a first saturation value and may not output digital values larger than a second saturation value.

If the level of the sensing voltage Vsen input to the analog-to-digital converter ADC is equal to or less than the analog-to-digital converting reference voltage EVref, the analog-to-digital converter ADC outputs the first saturation value.

When the level of the sensing voltage Vsen input to the analog-to-digital converter ADC is larger than or equal to the analog-to-digital converting reference voltage plus a predetermined voltage range (EVref+ADC Range), the analog-to-digital converter ADC outputs the second saturation value.

According to the foregoing description, if the level of the sensing voltage Vsen is the analog-to-digital converting reference voltage EVref or less or the level of the sensing voltage Vsen is not less than the analog-to-digital converting reference voltage plus the predetermined voltage range (EVref+ADC Range), the analog-to-digital converter ADC is unable to output a digital value exactly corresponding to the corresponding sensing voltage Vsen.

Figure 6:
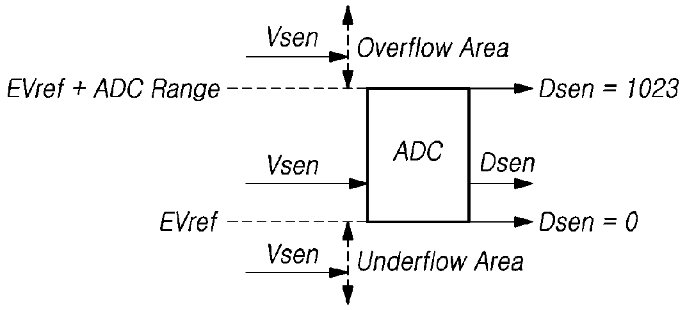
FIG. 6 is a view exemplarily illustrating an analog-to-digital converting process of an analog-to-digital converter ADC according to the present disclosure.

FIG. 6 is a view exemplarily illustrating an analog-to-digital converting process of an analog-to-digital converter ADC according to the present disclosure.

Referring to FIG. 6, if the level of the sensing voltage Vsen input to the analog-to-digital converter ADC is equal to or less than the analog-to-digital converting reference voltage EVref, the analog-to-digital converter ADC outputs the first saturation value. When the level of the sensing voltage Vsen input to the analog-to-digital converter ADC is larger than or equal to the analog-to-digital converting reference voltage plus a predetermined voltage range (EVref+ADC Range), the analog-to-digital converter ADC outputs the second saturation value.

For example, when the resolution of the analog-to-digital converter ADC is 10 bits, the first saturation value may be 0, and the second saturation value may be 1023.

When the level of the sensing voltage Vsen is included in an underflow area that is equal to or less than the analog-to-digital converting reference voltage EVref, the analog-to-digital converter ADC outputs the first saturation value regardless of the level of the sensing voltage Vsen. When the level of the sensing voltage Vsen is included in an overflow area that is larger than or equal to the analog-to-digital converting reference voltage plus the predetermined voltage range (EVref+ADC Range), the analog-to-digital converter ADC outputs the second saturation value regardless of the level of the sensing voltage Vsen.

The controller 140 may receive the digital value output from the analog-to-digital converter ADC, calculate a sub-pixel degradation compensation value and control the data driving circuit to input a data signal reflecting the calculated degradation compensation value to the corresponding sub-pixel.

When the first saturation value or the second saturation value is input to the controller 140, such an issue may arise that it is impossible to properly compensate for the characteristic value of the corresponding subpixel.

Figure 7:
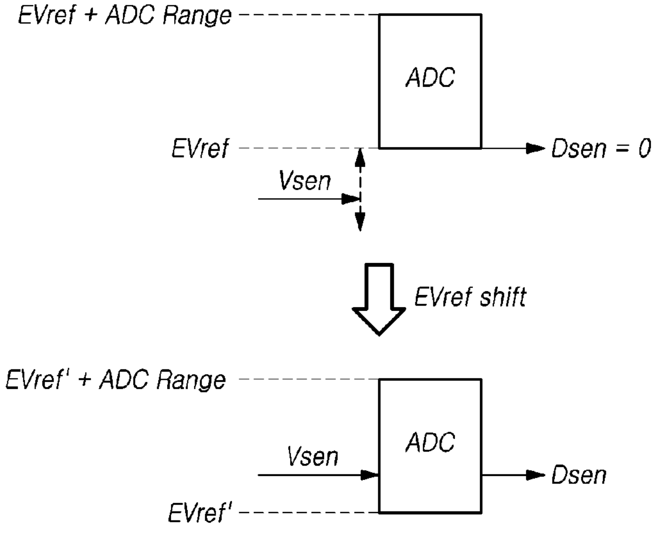
FIG. 7 is a view illustrating an example in which an analog-to-digital converting reference voltage EVref is changed depending on the level of a sensing voltage Vsen input to an analog-to-digital converter ADC.

FIG. 7 is a view illustrating an example in which an analog-to-digital converting reference voltage EVref is changed depending on the level of a sensing voltage Vsen input to an analog-to-digital converter ADC.

Referring to FIG. 7, if the level of the sensing voltage Vsen input to the analog-to-digital converter ADC is included in the underflow area, the voltage level of the analog-to-digital converting reference voltage EVref may be changed to decrease.

Specifically, the voltage level of the analog-to-digital converting reference voltage EVref may be decreased until the level of the sensing voltage Vsen is not included in the underflow area.

As another example, if the level of the sensing voltage Vsen input to the analog-to-digital converter ADC is included in the above-described overflow area, the voltage level of the analog-to-digital converting reference voltage EVref may be changed to increase.

Specifically, the voltage level of the analog-to-digital converting reference voltage EVref may be increased until the level of the sensing voltage Vsen is not included in the overflow area.

Referring to FIG. 7, after the voltage level of the analog-to-digital converting reference voltage EVref is changed, an analog-to-digital converting reference voltage EVref of the changed voltage level is applied to the analog-to-digital converter ADC.

As the voltage level of the analog-to-digital converting reference voltage EVref is changed according to the level of the sensing voltage Vsen, the analog-to-digital converter ADC may output a digital value between the first saturation value and second saturation value reflecting the characteristic value of the subpixel.

Figure 8:
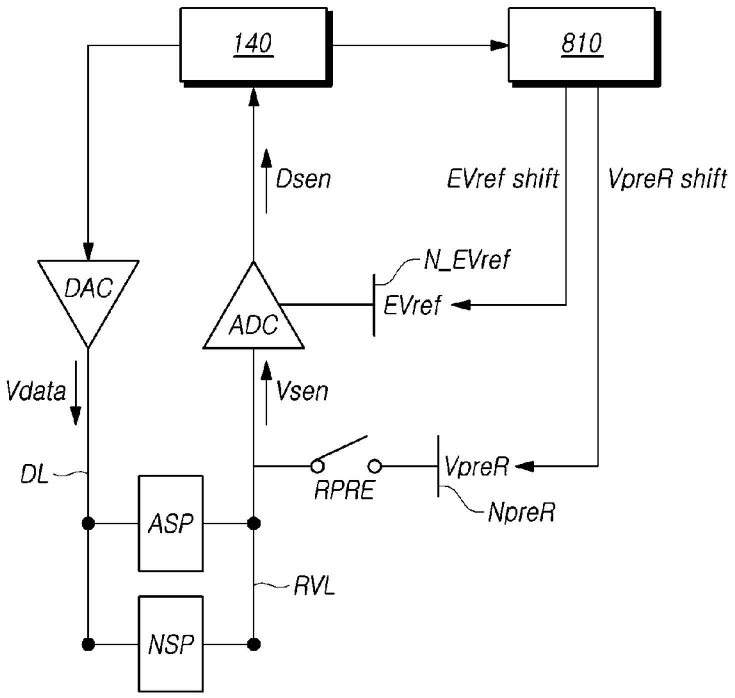
FIG. 8 is a view illustrating a characteristic in which the voltage level of an analog-to-digital converting reference voltage EVref and a driving reference voltage VpreR is varied depending on the level of a sensing voltage Vsen.

FIG. 8 is a view illustrating a characteristic in which the voltage level of an analog-to-digital converting reference voltage EVref and a driving reference voltage VpreR is varied depending on the level of a sensing voltage Vsen.

Referring to FIG. 8, the analog-to-digital converter ADC receives a sensing voltage Vsen reflecting the characteristic value of at least one subpixel SP and outputs a digital value Dsen corresponding to the sensing voltage Vsen to the controller 140.

When the input digital value Dsen is the first saturation value or the second saturation value, the controller 140 senses the above-described at least one subpixel SP again.

The power management circuit 810 may change the voltage level of the analog-to-digital converting reference voltage EVref under the control of the controller 140.

The controller 140 may control the power management circuit 810 to decrease the voltage level of the analog-to-digital converting reference voltage EVref when the input digital value Dsen is the first saturation value.

The controller 140 may control the power management circuit 810 to increase the voltage level of the analog-to-digital converting reference voltage EVref when the input digital value Dsen is the second saturation value.

The power management circuit 810 may perform at least one of a first driving operation for decreasing the voltage level of the analog-to-digital converting reference voltage EVref by a preset voltage level and a second driving operation for increasing the voltage level by a preset voltage level.

The controller 140 may sense the characteristic values of the plurality of subpixels SP during an off-sensing process period after a turn-off signal is input to the display device.

The controller 140 may control the power management circuit 810 to increase or decrease the voltage level of the analog-to-digital converting reference voltage EVref during the off-sensing process period.

The controller 140 may perform sensing driving operation to compensate for the characteristic values of the plurality of subpixels SP during the off-sensing process period.

The plurality of subpixels SP may include normal subpixels NSP having a digital value Dsen reflecting the characteristic value of the corresponding subpixel SP being between the first saturation value and the second saturation value and abnormal subpixels ASP having a digital value Dsen reflecting the characteristic value of the corresponding subpixel SP being the first saturation value or second saturation value.

The controller 140 may sense the characteristic values of the plurality of subpixels SP once for each during the off-sensing process period and then sense the characteristic values of the abnormal subpixels ASP again.

The analog-to-digital converting reference voltage EVref is input to the analog-to-digital converting reference voltage input node N_EVref of the analog-to-digital converter ADC. The voltage level of the analog-to-digital converting reference voltage EVref may differ at the time when the characteristic values of the plurality of subpixels SP are sensed once for each and at the time when the characteristic values of the abnormal subpixels ASP are sensed again.

The controller 140 may sense the characteristic value of the at least one subpixel SP again after the voltage level of the analog-to-digital converting reference voltage EVref is changed.

At least one subpixel may be an abnormal subpixel ASP.

The analog-to-digital converter ADC converts the sensing voltage Vsen into a digital value Dsen according to the changed analog-to-digital converting reference voltage EVref and outputs it to the controller 140.

The controller 140 may calculate a compensation value for the above-described at least one subpixel SP when the input digital value Dsen is a value between the first saturation value and the second saturation value and may store the calculated compensation value in the memory.

The controller 140 may store, in the memory, the degree of the change in the voltage level of the analog-to-digital converting reference voltage EVref.

If the display device is turned back on after the off-sensing processor period is terminated, the controller 140 may control the power management circuit 810 to change the voltage level of the driving reference voltage VpreR.

Specifically, the timing controller may control the power management circuit 810 to change the voltage level of the driving reference voltage VpreR based on the degree of change in the analog-to-digital converting reference voltage EVref.

When the voltage level of the analog-to-digital converting reference voltage EVref is decreased by a first voltage level during the off-sensing process period, the power management circuit 810 may decrease the voltage level of the driving reference voltage VpreR by the above-described first voltage level and input it to the driving reference voltage input node NpreR. When the voltage level of the analog-to-digital converting reference voltage EVref is increased by the first voltage level during the off-sensing process period, the power management circuit 810 may increase the voltage level of the driving reference voltage VpreR by the above-described first voltage level and input it to the driving reference voltage input node NpreR.

The driving reference voltage VpreR is a voltage input to the reference voltage line RVL, and is a voltage commonly applied to a plurality of subpixels SP electrically connected to the reference voltage line RVL. Specifically, the driving reference voltage VpreR is a common voltage jointly input to the plurality of subpixels SP during an active period when the data signal Vdata for image display is input to the plurality of data lines DL.

The controller 140 controls the voltage level of the data signal Vdata input to the normal subpixel NSP based on the above-described degree of change in the voltage level of the analog-to-digital converting reference voltage EVref.

For example, when the voltage level of the analog-to-digital converting reference voltage EVref is decreased or increased by the first voltage level, the controller 140 may perform additional compensation for decreasing or increasing the voltage level of the data signal Vdata input to the normal subpixel NSP by the first voltage level.

Accordingly, even when the voltage level of the driving reference voltage VpreR, which is the common voltage, is changed, the change in the voltage level of the driving reference voltage VpreR is not reflected to the voltage difference Vgs between the gate node and source node of the driving transistor included in the normal subpixel NSP.

The controller 140 may control the data driving circuit to output a data signal Vdata reflecting the degradation compensation value of the corresponding subpixel SP as the data signal Vdata input to the abnormal subpixel ASP.

Accordingly, the change in the voltage level of the driving reference voltage VpreR may be reflected to the voltage difference between the gate node and source node of the driving transistor included in the abnormal subpixel ASP.

In the display device according to the disclosure, the voltage level of the driving reference voltage VpreR and the voltage level of the data signal Vdata reflect the degree of change in the voltage level of the analog-to-digital converting reference voltage EVref, allowing for additional compensation for the degradation of the abnormal subpixel ASP for which it was conventionally hard to normally compensate for a change in characteristic value. This leads to substantially the same effect as increasing the lifespan of the display device.

Figure 9:
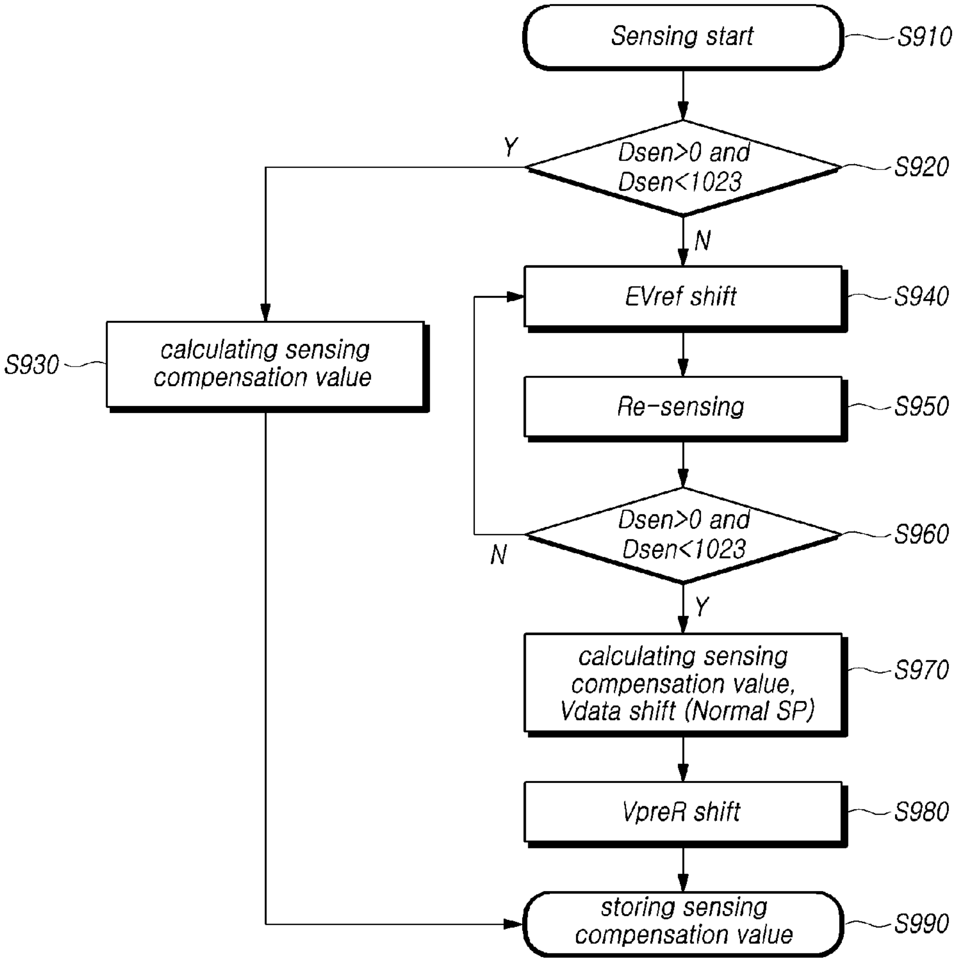
FIG. 9 is a flow chart schematically illustrating a method for driving a display device according to the present disclosure.

FIG. 9 is a flow chart schematically illustrating a method for driving a display device according to the present disclosure.

Referring to FIG. 9, the display device according to the present disclosure may perform sensing driving operation to compensate for a change in characteristic values of a plurality of subpixels.

The analog-to-digital converter ADC receives a sensing voltage Vsen reflecting the characteristic value of at least one subpixel SP and outputs a digital value Dsen corresponding to the sensing voltage Vsen (S910).

The analog-to-digital converter ADC may output a first saturation value as the digital value Dsen if the input sensing voltage Vsen is smaller than the analog-to-digital converting reference voltage EVref. The analog-to-digital converter ADC may output a second saturation value if the input sensing voltage Vsen is equal to or larger than the analog-to-digital converting reference voltage plus a predetermined voltage range (EVref+ADC Range). If the input sensing voltage Vsen is more than the analog-to-digital converting reference voltage EVref and is less than the analog-to-digital converting reference voltage plus the predetermined voltage range (EVref+ADC Range), the analog-to-digital converter ADC outputs a digital value Dsen between the first saturation value and the second saturation value.

The controller 140 may determine whether the input digital values Dsen includes the first saturation value or the second saturation value. (S920)

When all of the digital values output from the analog-to-digital converter ADC are digital values between the first saturation value and the second saturation value, the controller 140 calculates a sensing compensation value according to a first sensing driving step (S930) and stores the calculated sensing compensation value in the memory (S990), and the sensing driving operation is terminated.

When at least one digital value among all the digital values output from the analog-to-digital converter ADC is the first saturation value or the second saturation value, the controller 140 controls the power management circuit to change the voltage level of the analog-to-digital converting reference voltage EVref. (S940)

If the voltage level of the analog-to-digital converting reference voltage EVref is changed, the controller 140 performs repeated sensing driving operation on at least one subpixel SP for which the first saturation value or second saturation value is calculated (S950).

The repeated sensing driving operation may be performed, e.g., at a time after the first sensing driving operation on the plurality of subpixels SP is terminated.

Accordingly, during the first sensing driving operation, the voltage level of the analog-to-digital converting reference voltage EVref may remain constant.

The timing controller may determine whether the digital value Dsen input is a digital value between the first saturation value and the second saturation value according to repeated sensing driving operation (S960).

When the digital value input according to the repeated sensing driving operation is the first saturation value or the second saturation value, the controller 140 changes the voltage level of the analog-to-digital converting reference voltage EVref again (S940) and performs repeated sensing driving operation again (S950).

In other words, the controller 140 may perform the repeated sensing driving operation until the level of the sensing voltage Vsen is larger than the level of the analog-to-digital converting reference voltage EVref and is smaller than the level of the analog-to-digital converting reference voltage plus the predetermined voltage range (EVref+ADC Range) (i.e., EVref<Vsen<EVref+ADC Range).

Such repeated sensing driving operation may be performed two times or more.

When all the digital values input according to the repeated sensing driving operation are values between the first saturation value and the second saturation value, the controller 140 calculates a sensing compensation value for all the subpixels based on the digital values input according to the first sensing driving operation and the repeated sensing driving operation (S970).

The controller 140 calculates an additional compensation value based on the changed voltage level of the analog-to-digital converting reference voltage EVref (S970).

During the image display period after the display device is turned back on, the data signal Vdata reflecting the additional compensation value may be input to the normal subpixels NSP for which the digital value input to the controller 140 during the period when the first sensing driving operation is performed is between the first saturation value and the second saturation value.

The controller 140 may calculate the degree of change in the voltage level of the driving reference voltage VpreR based on the degree of change in the voltage level of the analog-to-digital converting reference voltage EVref. The power management circuit may change the voltage level of the driving reference voltage VpreR under the control of the controller 140 (S980).

Unlike shown in FIG. 9, the step S980 of changing the voltage level of the driving reference voltage VpreR may be performed along with the step S940 of changing the voltage level of the analog-to-digital converting reference voltage EVref.

As an example, the power management circuit may change the voltage level of the driving reference voltage VpreR by a preset voltage level in the step S940 of changing the voltage level of the analog-to-digital converting reference voltage EVref by the preset voltage level.

The voltage level of the driving reference voltage VpreR input to the driving reference voltage input node NpreR may be changed based on the degree of change in the voltage level of the analog-to-digital converting reference voltage EVref.

The timing when the voltage level-changed driving reference voltage VpreR is input to the reference voltage line RVL may be an active period after the display device is powered on.

The controller 140 may store sensing compensation values for the plurality of subpixels SP (S990).

The controller 140 may store the additional compensation value of the normal subpixel Normal SP in the memory.

Accordingly, if the display device is turned back on in the period after the off-sensing process, the data driving circuit may output, to the data line, the data signal Vdata reflecting the sensing compensation value and/or additional compensation value of the plurality of subpixels SP, calculated during the off-sensing process period.

Accordingly, it is possible to compensate for characteristic values even for abnormal subpixels ASP for which it was conventionally difficult to compensate for changes in characteristic values. Therefore, it is possible to substrate increase the lifespan of the display device.

The foregoing aspects are briefly described below.

According to aspects of the disclosure, there may be provided a display device 100, comprising a reference voltage line RVL electrically connected with a first node NpreR and receiving a sensing voltage Vsen reflecting a characteristic value of at least one subpixel SP; and an analog-to-digital converter ADC including a second node N_EVref, receiving the sensing voltage Vsen, and outputting a digital value Dsen corresponding to the sensing voltage Vsen, wherein a voltage level of a driving reference voltage VpreR applied to the first node NpreR and a voltage level of an analog-to-digital converting reference voltage EVref applied to the second node N_EVref are changed depending on a level of the sensing voltage Vsen.

According to aspects of the disclosure, there may be provided the display device, wherein a degree of the change in the voltage level of the driving reference voltage VpreR is identical to a degree of the change in the voltage level of the analog-to-digital converting reference voltage EVref.

According to aspects of the disclosure, there may be provided the display device, further comprising a power management circuit 810 controlling the voltage level of the driving reference voltage VpreR and the voltage level of the analog-to-digital converting reference voltage EVref.

According to aspects of the disclosure, there may be provided the display device, wherein the analog-to-digital converter converts an analog voltage in a predetermined voltage range from the analog-to-digital converting reference voltage into a digital value corresponding to the analog voltage and outputs the digital value.

According to aspects of the disclosure, there may be provided the display device, wherein the power management circuit 810 performs at least one driving of a first driving operation for decreasing the voltage levels of the analog-to-digital converting reference voltage EVref and the driving reference voltage VpreR if the level of the sensing voltage Vsen is not more than the analog-to-digital converting reference voltage EVref and a second driving operation for increasing the voltage levels of the analog-to-digital converting reference voltage EVref and the driving reference voltage VpreR if the level of the sensing voltage Vsen is not less than the analog-to-digital converting reference voltage plus the predetermined voltage range (EVref+ADC Range).

According to aspects of the disclosure, there may be provided the display device, further comprising a controller receiving the digital value and performing a repeated sensing driving operation which repeatedly senses the characteristic value of the at least one subpixel if a first saturation value or a second saturation value is input to the controller.

According to aspects of the disclosure, there may be provided the display device further comprising a controller 140 receiving the digital value Dsen, wherein the analog-to-digital converter ADC outputs a first saturation value if the level of the sensing voltage Vsen of the at least one subpixel SP is not more than the analog-to-digital converting reference voltage EVref and outputs a second saturation value if the level of the sensing voltage Vsen of the at least one subpixel SP is not less than the voltage level of the analog-to-digital converting reference voltage plus the predetermined voltage range (EVref+ADC Range), and wherein the controller 140 performs a repeated sensing driving operation which again senses the characteristic value of the at least one subpixel SP if the first saturation value or the second saturation value is input to the controller 140.

According to aspects of the disclosure, there may be provided the display device, wherein during a period when the repeated sensing driving operation is performed, the power management circuit 810 changes the voltage level of the analog-to-digital converting reference voltage EVref by a preset voltage level and inputs the changed voltage level of the analog-to-digital converting reference voltage EVref to the second node N_EVref.

According to aspects of the disclosure, there may be provided the display device, wherein the controller 140 performs the repeated sensing driving operation two or more times until the level of the sensing voltage Vsen is larger than the analog-to-digital converting reference voltage EVref and smaller than the voltage level of the analog-to-digital converting reference voltage EVref plus the predetermined voltage range (EVref+ADC Range).

According to aspects of the disclosure, there may be provided the display device, wherein the controller 140 performs the repeated sensing driving operation for again sensing the characteristic value of the at least one subpixel ASP after performing first sensing driving operation for sensing a characteristic value of a plurality of subpixels SP.

According to aspects of the disclosure, there may be provided the display device, further comprising a data driving circuit 120 configured to control a data signal Vdata to input to a plurality of the data lines DL, wherein the controller 140 controls the data driving circuit 120 to input a data signal Vdata reflecting the degree of change in the voltage levels of the analog-to-digital converting reference voltage EVref and the driving reference voltage VpreR to remaining subpixels NSP except for the at least one subpixel ASP among the plurality of subpixels SP.

According to aspects of the disclosure, there may be provided the display device, wherein a driving period of the display device 100 includes an active period during which a data signal Vdata for image display is input to a plurality of data lines DL and a blank period between two different active periods, and wherein the driving reference voltage VpreR is a voltage input to the at least one subpixels SP electrically connected with the reference voltage line RVL during the active period.

According to aspects of the disclosure, there may be provided a method for driving a display device 100, comprising: receiving a sensing voltage Vsen reflecting a characteristic value of at least one subpixel SP from a reference voltage line RVL and outputting a digital value Dsen corresponding to the received sensing voltage Vsen to a controller 140, by an analog-to-digital converter ADC (S910); changing a voltage level of an analog-to-digital converting reference voltage EVref input to the analog-to-digital converter ADC based on the sensing voltage Vsen (S940); and changing a voltage level of a driving reference voltage VpreR input to a first node NpreR based on a degree of the change in the voltage level of the analog-to-digital converting reference voltage EVref (S980), wherein the first node NpreR is a node electrically connected with the reference voltage line RVL.

According to aspects of the disclosure, there may be provided the method further comprising determining whether the input digital value Dsen corresponds to a first saturation value or a second saturation value of the analog-to-digital converter ADC, by the controller 140 (S920); and performing a repeated sensing driving operation on a subpixel for which a voltage reflecting a characteristic value of a subpixel is changed to the first saturation value or the second saturation value among the at least one subpixels SP, by the controller 140 (S950).

According to aspects of the disclosure, there may be provided the method further comprising storing, in a memory, an additional compensation value calculated according to the repeated sensing driving operation by the controller 140 (S970).

According to aspects of the disclosure, there may be provided a display device, comprising: an analog-to-digital converter configured to receive a sensing voltage reflecting a characteristic value of at least one subpixel from a reference voltage line and to output a digital value corresponding to the received sensing voltage; a controller configured to receive the digital value from the analog-to-digital converter and to sense the characteristic value of the at least one subpixel when the received digital value is a first saturation value or a second saturation value; and a power management circuit configured to change an analog-to-digital converting reference voltage under control of the controller, wherein the controller is configured to control the analog-to-digital converter to change a voltage level of the analog-to-digital converting reference voltage during an off-sensing process period and to perform a sensing driving operation to compensate for characteristic values of the at least one subpixels during the off-sensing process period.

According to aspects of the disclosure, there may be provided the display device, wherein the at least one subpixels include normal subpixels having the digital value reflecting the characteristic value of a corresponding subpixel between the first saturation value and the second saturation value and abnormal subpixels having the digital value reflecting the characteristic value of a corresponding subpixel of the first saturation value or the second saturation value.

According to aspects of the disclosure, there may be provided the display device, wherein the controller performs a repeated sensing driving operation which repeatedly senses the characteristic value of the at least one subpixel if the first saturation value or the second saturation value is input to the controller.

According to aspects of the disclosure, there may be provided the display device, wherein the power management circuit is configured to decrease the analog-to-digital converting reference voltage when the input digital value is the first saturation value and to increase the analog-to-digital converting reference voltage when the input digital value is the second saturation value.

According to aspects of the disclosure, there may be provided the display device, wherein the analog-to-digital converter is configured to output the first saturation value when the level of the sensing voltage of the at least one subpixel is not greater than the analog-to-digital converting reference voltage, and is configured to output the second saturation value when the level of the sensing voltage of the at least one subpixel is not less than the voltage level of the analog-to-digital converting reference voltage plus the predetermined voltage range.

The above-described aspects are merely examples, and it will be appreciated by one of ordinary skill in the art various changes may be made thereto without departing from the scope of the disclosure. Accordingly, the aspects set forth herein are provided for illustrative purposes, but not to limit the scope of the disclosure, and should be appreciated that the scope of the present disclosure is not limited by the aspects. The scope of the present disclosure should be construed by the following claims, and all technical spirits within equivalents thereof should be interpreted to belong to the scope of the present disclosure.

What is claimed is:

1. A display device, comprising:

a reference voltage line electrically connected with a first node and receiving a sensing voltage reflecting a characteristic value of at least one subpixel; and an analog-to-digital converter including a second node, configured to receive the sensing voltage and output a digital value corresponding to the sensing voltage, wherein a voltage level of a driving reference voltage applied to the first node and a voltage level of an analog-to-digital converting reference voltage applied to the second node are changed depending on a voltage level of the sensing voltage.

2. The display device of claim 1, wherein a degree of the change in the voltage level of the driving reference voltage is identical to a degree of the change in the voltage level of the analog-to-digital converting reference voltage.

3. The display device of claim 1, further comprising a power management circuit configured to control the voltage level of the driving reference voltage and the voltage level of the analog-to-digital converting reference voltage.

4. The display device of claim 3, wherein the analog-to-digital converter is configured to convert an analog voltage in a predetermined voltage range from the analog-to-digital converting reference voltage into a digital value corresponding to the analog voltage and output the digital value.

5. The display device of claim 4, wherein the power management circuit performs at least one driving operation of:

a first driving operation for decreasing the voltage levels of the analog-to-digital converting reference voltage and the driving reference voltage if the level of the sensing voltage is not greater than the analog-to-digital converting reference voltage; and a second driving operation for increasing the voltage levels of the analog-to-digital converting reference voltage and the driving reference voltage if the level of the sensing voltage is not less than the analog-to-digital converting reference voltage plus the predetermined voltage range.

6. The display device of claim 4, further comprising a controller configured to receive the digital value and performing a repeated sensing driving operation which repeatedly senses the characteristic value of the at least one subpixel if a first saturation value or a second saturation value is input to the controller.

7. The display device of claim 6, wherein the first saturation value is output from the analog-to-digital converter if the level of the sensing voltage of the at least one subpixel is not greater than the analog-to-digital converting reference voltage, and the second saturation value is output from the analog-to-digital converter the if the level of the sensing voltage of the at least one subpixel is not less than the voltage level of the analog-to-digital converting reference voltage plus the predetermined voltage range.

8. The display device of claim 6, wherein, during a period when the repeated sensing driving operation is performed, the power management circuit changes the voltage level of the analog-to-digital converting reference voltage by a preset voltage level and inputs the changed voltage level of the analog-to-digital converting voltage to the second node.

9. The display device of claim 6, wherein the controller performs the repeated sensing driving operation two or more times until the level of the sensing voltage is greater than the analog-to-digital converting reference voltage and smaller than the voltage level of the analog-to-digital converting reference voltage plus the predetermined voltage range.

10. The display device of claim 6, wherein the controller performs the repeated sensing driving operation for repeatedly sensing the characteristic value of the at least one subpixel after performing first sensing driving operation for sensing a characteristic value of a plurality of subpixels.

11. The display device of claim 10, further comprising a data driving circuit configured to control a data signal to input to a plurality of data lines, wherein the controller controls the data driving circuit to input a data signal reflecting the degree of change in the voltage levels of the analog-to-digital converting reference voltage and the driving reference voltage to remaining subpixels except for the at least one subpixel among the plurality of subpixels.

12. The display device of claim 1, wherein the display device has a driving period that includes an active period during which a data signal for image display is input to a plurality of data lines and a blank period between two different active periods, and wherein the driving reference voltage is a voltage input to the at least one subpixels electrically connected with the reference voltage line during the active period.

13. A method for driving a display device, the method comprising:

receiving a sensing voltage reflecting a characteristic value of at least one subpixel from a reference voltage line and outputting a digital value corresponding to the received sensing voltage to a controller, by an analog-to-digital converter;

changing a voltage level of an analog-to-digital converting reference voltage input to the analog-to-digital converter based on the sensing voltage; and changing a voltage level of a driving reference voltage input to a first node based on a degree of the change in the voltage level of the analog-to-digital converting reference voltage, wherein the first node is a node electrically connected with the reference voltage line.

14. The method of claim 13, further comprising:

determining whether the input digital value corresponds to a first saturation value or a second saturation value of the analog-to-digital converter, by the controller; and performing a repeated sensing driving operation on a subpixel for which a voltage reflecting a characteristic value of a subpixel is changed to the first saturation value or the second saturation value among the at least one subpixels, by the controller.

15. The method of claim 14, further comprising storing, in a memory, an additional compensation value calculated according to the repeated sensing driving operation by the controller.

16. A display device, comprising:

an analog-to-digital converter configured to receive a sensing voltage reflecting a characteristic value of at least one subpixel from a reference voltage line and to output a digital value corresponding to the received sensing voltage;

a controller configured to receive the digital value from the analog-to-digital converter and to sense the characteristic value of the at least one subpixel when the received digital value is a first saturation value or a second saturation value; and a power management circuit configured to change an analog-to-digital converting reference voltage under control of the controller, wherein the controller is configured to control the analog-to-digital converter to change a voltage level of the analog-to-digital converting reference voltage during an off-sensing process period and to perform a sensing driving operation to compensate for characteristic values of the at least one subpixels during the off-sensing process period.

17. The display device of claim 16, wherein the at least one subpixels include normal subpixels having the digital value reflecting the characteristic value of a corresponding subpixel between the first saturation value and the second saturation value and abnormal subpixels having the digital value reflecting the characteristic value of a corresponding subpixel of the first saturation value or the second saturation value.

18. The display device of claim 16, wherein the controller performs a repeated sensing driving operation which repeatedly senses the characteristic value of the at least one subpixel if the first saturation value or the second saturation value is input to the controller.

19. The display device of claim 16, wherein the power management circuit is configured to decrease the analog-to-digital converting reference voltage when the input digital value is the first saturation value and to increase the analog-to-digital converting reference voltage when the input digital value is the second saturation value.

20. The display device of claim 16, wherein the analog-to-digital converter is configured to output the first saturation value when the level of the sensing voltage of the at least one subpixel is not greater than the analog-to-digital converting reference voltage, and is configured to output the second saturation value when the level of the sensing voltage of the at least one subpixel is not less than the voltage level of the analog-to-digital converting reference voltage plus the predetermined voltage range.

* * * * *